United States Patent [19]

Uttech

[11] 4,185,927
[45] Jan. 29, 1980

[54] MIXER FOR RECONSTITUTING DEHYDRATED MASHED POTATOES

[75] Inventor: Raymond E. Uttech, Watertown, Wis.

[73] Assignee: Karma Division of Brandt, Inc., Watertown, Wis.

[21] Appl. No.: 953,415

[22] Filed: Oct. 23, 1978

[51] Int. Cl.² .................... B01F 7/04; B01F 15/02
[52] U.S. Cl. ...................... 366/131; 366/158; 366/196; 366/604
[58] Field of Search ............... 366/131, 156, 157, 158, 366/604, 196, 279

[56] References Cited

U.S. PATENT DOCUMENTS

| | | | |
|---|---|---|---|
| 2,510,955 | 6/1950 | Brown | 366/604 |
| 3,140,861 | 7/1964 | Krup | 366/156 |
| 3,330,536 | 7/1967 | Efstathiou | 366/604 |
| 3,341,468 | 9/1967 | Rosen | 366/604 |

*Primary Examiner*—Robert W. Jenkins

[57] ABSTRACT

In a mixing machine having a cylindrical mixing chamber in which a centrifuging agitator coaxially rotates on a horizontal axis, an inlet duct for dry mix material and liquid curves downwardly and towards one end wall of the chamber and an outlet duct for mixture curves downward and away from said end wall. Material to be mixed thus enters the chamber in substantially horizontal flow through an inlet port in said end wall, all portions of said port being spaced radially inwardly from the cylindrical chamber wall and below the level of the chamber axis. Mixture leaves the chamber in substantially horizontal flow through an outlet port wholly spaced below the inlet port and extending down to the level of the bottom of the chamber. Centrifuging action maintains a pressure difference between the ports that assures fast movement of materials through the mixing chamber to prevent plugging of the machine when mashed potato mix is used.

6 Claims, 5 Drawing Figures

MIXER FOR RECONSTITUTING DEHYDRATED MASHED POTATOES

TECHNICAL FIELD OF THE INVENTION

This invention relates to apparatus for quickly mixing a liquid with a dry particulate food or beverage material, and the invention is more particularly concerned with a dispensing mixer that is capable of mixing dehydrated mashed potato mix with hot water to produce a palatable serving of mashed potatoes.

BACKGROUND OF THE INVENTION

Dehydrated mashed potato mix, which is now widely available, need only be mixed with hot water for preparation of ready-to-serve mashed potatoes. From the standpoint of appearance, taste and texture the reconstituted product is practically indistinguishable from mashed fresh potatoes, and the dehydrated mixes, by conserving labor and storage space, offer very substantial savings to restaurants, catering organizations and institutions.

For maximum economy, servings of reconstituted mashed potato mix should be prepared as and when they are needed, so that every portion will be hot and fresh and none of the dehydrated material will be wasted. However, manual mixing of individual servings or small batches is obviously impractical and inefficient, and heretofore no mixer has been available that could quickly mix and dispense single portions of the reconstituted product.

Attempts have been made to employ hot beverage dispensers for reconstituting and dispensing mashed potato mix, and at first the use of such machines seemed very promising, but after a time it was found that they were not suitable for the purpose. In a beverage dispenser for whipped hot chocolate, for example, metered quantities of hot water and chocolate mix powder are run into a funnel-like hopper from which they fall into the top of a mixing chamber wherein a small centrifuging agitator rotates at high speed. The agitator thoroughly mixes the hot water and dry material and whips air into the mixture. The mixture leaves the mixing chamber through an outlet in its bottom and passes into a downwardly projecting spout that guides it into a cup or the like.

The mixed beverages dispensed by machines of the type just described are essentially liquids that flow very freely and have a little tendency to settle on the surfaces of the mixing chamber and the ducts that extend downwardly to and from it. By contrast, reconstituted mashed potato mix, when ready to serve, is so thick and viscous that it flows only in response to rather substantial force or pressure, and it is sticky enough to leave deposits even on a surface as smooth as that of a glazed china plate.

Notwithstanding these important differences between the mixed products, it appeared during the initial attempts to employ hot beverage dispensers for reconstituting mashed potato mix that satisfactory operation could be obtained by merely reducing the input of hot water in proportion to the rate at which dry material was fed into the mixing chamber. A hot beverage machine so adjusted could very quickly dispense several servings of mashed potatoes with no apparent difficulty. After prolonged operation, however, a point was usually reached at which the machine became plugged with mashed potatoes and stopped dispensing.

Investigation disclosed that this peculiarly unreliable behavior of the beverage machine was due to the manner in which dehydrated mashed potato material combines with water. When initially mixed with water, the dehydrated material forms a slurry that flows very freely. Within a very few seconds, however, the individual particles of the mix absorb sufficient water to swell and combine into a substantially non-flowing mass. It was found that in the conventional beverage dispenser most of the particles of dehydrated material passed through the machine during the critical period of four or five seconds before congealing took place, but a certain amount of material remained in the mixing chamber for a longer time and formed a deposit on its inner surface. As this deposit built up, increasing proportions of the material were retained in the mixing chamber too long, and the build-up of deposited material accelerated to the point where the inlet or the outlet of the mixing chamber, or both, were plugged with mashed potato.

After the mechanics of the plugging process had been discovered, it was evident that a successful machine for reconstituting and dispensing mashed potato mix had to be so arranged that none of the mix material would be retained in the mixing chamber for more than about three seconds. But it was by no means obvious how a machine could be designed to ensure the attainment of that objective, especially in view of other and equally important requirements that must be met.

For complete success, mixing of the dehydrated potato material with water must not only be fast but thorough. The particles of mix material should be distributed fairly uniformly through the water, and any clumps or clusters of particles should be broken up and dispersed so that every surface of every particle is exposed to the water. In addition, air should be whipped into the mixture as it is being formed, so that the dispensed product will be light and fluffy.

These mixing requirements should be met in apparatus that is simple, inexpensive and sanitary. There should be no surfaces along the path of the mix material that are not readily accessible for cleaning, and preferably all parts of the machine that are exposed to wet or moistened mix particles should be capable of being thoroughly cleaned by flushing or rinsing. Obviously the machine should be compact, attractive in appearance, and require a minimum of power for its operation. Low cost is another obvious imperative, and for its attainment the machine should incorporate as many components as possible that are standard with other types of mixing and dispensing equipment.

The general object of the present invention is to provide a mixing machine which is capable of reconstituting and dispensing dehydrated mashed potato material and which fully and satisfactorily meets all of the above-stated requirements and desiderata.

Thus it is also a general object of this invention to provide a machine that is capable of mixing dehydrated mashed potato mix with hot water and reliably dispensing one or several portions of fluffy, appealing mashed potatoes within a very few seconds.

Another general object of the invention is to provide a machine that enables restaurants and food service institutions to achieve optimum economy in the use of dehydrated mashed potato mix by effecting practically instant reconstitution of such material when it is required and in exactly the quantities in which it is required.

A more specific object of this invention is to provide a mixing and dispensing machine that can be used—with minor and easily made adjustments—with dry hot chocolate mix as well as with mashed potato mix.

A further specific object of the invention is to provide a mixing and dispensing machine of the above described character wherein most of the parts are standard components of widely available commercial beverage dispensing machines, to afford maximum economy in both the manufacture and the repair of machines of this invention.

With these observations and objectives in mind, the manner in which the invention achieves its purpose will be appreciated from the following description and the accompanying drawing, which exemplify the invention, it being understood that changes may be made in the specific apparatus disclosed herein without departing from the essentials of the invention set forth in the appended claims.

SUMMARY OF THE INVENTION

In general, the objects of the invention are achieved in a machine comprising a centrifuging agitator coaxially rotatable in a cylindrical mixing chamber that has a horizontal axis, an inlet duct for conducting dry material and liquid downwardly into the mixing chamber, and an outlet duct by which mixed product is conducted downwardly from the mixing chamber to be dispensed, said machine being characterized by: an end wall of the mixing chamber having apertures through which said ducts are communicated with the interior of the mixing chamber and which cooperate with the inlet duct to define an inlet zone and with the outlet duct to define an outlet zone, the inlet duct having a lower portion which curves downwardly and towards said end wall to deflect falling liquid and dry material substantially horizontally through said inlet zone and into the mixing chamber, the outlet duct having an upper portion which curves downwardly and away from said end wall and whereby mixture issuing substantially horizontally from the mixing chamber through said outlet zone is deflected into downward flow; said outlet zone being wholly in radially spaced relation to said axis and having its bottom at the level of the bottom of the mixing chamber so that mixture is forced out of the mixing chamber through said outlet zone by centrifuging action of the agitator; and said inlet zone being wholly in radially inwardly spaced relation to the cylindrical wall of the mixing chamber and having its bottom at a level below the level of said axis so that a substantial portion of the inlet zone is near said axis to enable material to be drawn into the mixing chamber through said inlet zone by the centrifuging action of the agitator.

BRIEF DESCRIPTION OF DRAWINGS

In the accompanying drawings, which illustrate an embodiment of the invention constructed according to the best mode so far devised for the practical application of its principles.

DETAILED DESCRIPTION OF THE INVENTION

Figure 1:
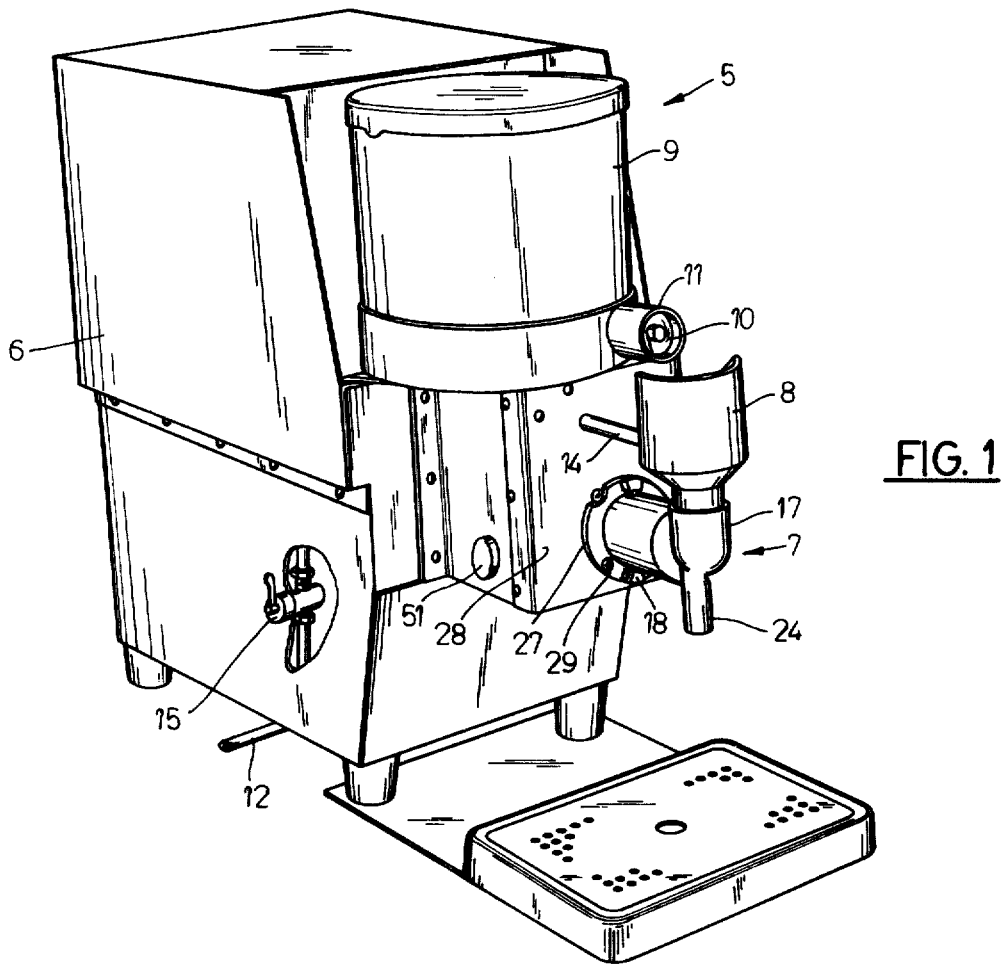
FIG. 1 is a perspective view of a mixing and dispensing machine embodying the principles of this invention.
Figure 2:
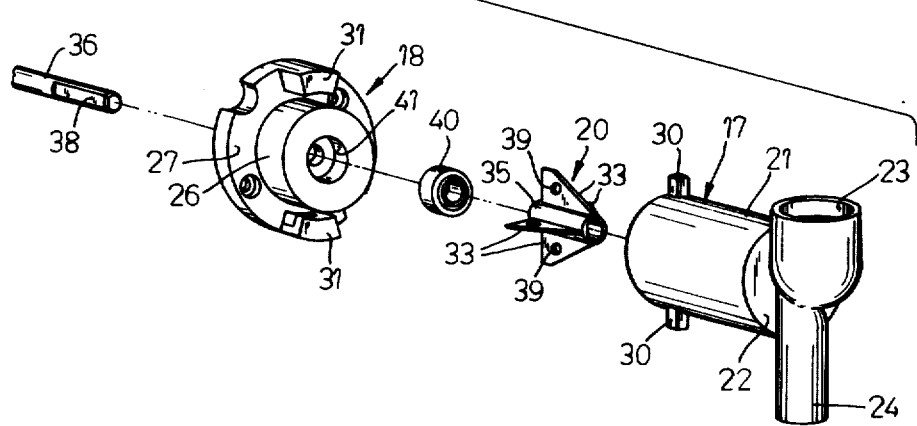
FIG. 2 is an exploded perspective view of the components of the mixing chamber assembly.
Figure 4:
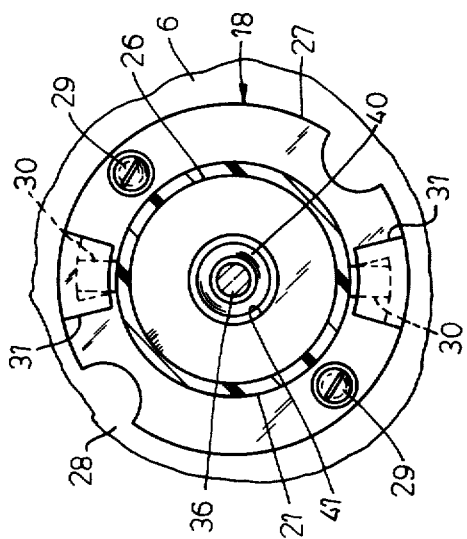
FIG. 4 is a sectional view taken on the plane of the line IV—IV in FIG. 3.

Referring now to the accompanying drawings, the machine of this invention, which is designated generally by 5, comprises a cabinet 6 which encloses certain components that are described hereinafter and which also supports at its front a mixing chamber assembly designated generally by 7. It will be immediately apparent that the machine 5 bears a general resemblance to commercially available machines for mixing and dispensing hot beverages, and in fact most of the structure of the machine 5 can be identical with such beverage machines, the important exception being the mixing chamber assembly 7.

Seated on top of the mixing chamber assembly 7 is a funnel-like hopper 8 into which dry particulate material and liquid are fed when the machine is in operation. For mashed potato dispensing, the liquid will normally be hot water and the dry particulate material will be dehydrated mashed potato mix in any of its commercially available forms, i.e., either small flakes or small granules.

A supply of the dry material is stored in a bin 9 that is mounted on the front of the cabinet. An auger or worm conveyor 10, extending through the bottom of the bin 9 and rotatably driven, as by a motor (not shown) that is housed inside the cabinet 6, draws the dry material out of the bottom of the bin and forces it at a steady, predetermined rate through a spout-like outlet 11 from which it falls into the hopper 8.

As shown, water is brought to the machine by means of a duct 12 that is connectable with an external water supply, but there may be a water tank (not shown) within the cabinet 6, and in any case the water is debouched into the hopper 8 from an outlet spout 14 that is connected with the duct 12 or other water source. It will be understood that the flow of water from the spout 14 is maintained at a predetermined rate, as by means of a control valve 15, and that just before emerging from the spout the water is heated in a conventional manner, as by means of an electric heating element (not shown) that is housed in the cabinet.

Those familiar with dispensing machines will appreciate that the cabient 6 can comprise suitable panels (not shown) or the like that cover the bin 9, the hopper 8 and the upper portion of the mixing chamber assembly 7.

Turning now to a consideration of the mixing chamber assembly 7 that embodies the principal characterizing features of this invention, it comprises a main body member 17, a supporting member 18 by which the body member 17 is mounted on the cabinet 6 and which cooperates with the body member to define a cylindrical mixing chamber 19, and a centrifuging agitator 20 that is coaxially rotatable in the mixing chamber 19.

The body member 17 can be formed in one piece and is preferably molded of a plastic such as polypropylene. It has a cup-shaped rear portion that provides a cylindrical side wall 21 and an apertured front end wall 22 for the mixing chamber 19. When the body member 17 is in place on the machine, the axis of the mixing chamber 19, which is of course concentric to the cylindrical side wall 21, is horizontal. A front portion of the body member is formed as an inlet duct 23 that curves downwardly and rearwardly, for conducting liquid and dry material into the mixing chamber, and an outlet duct 24 that curves downwardly and forwardly, for guiding mixed product away from the mixing chamber.

The supporting member 18 can also be molded in one piece, preferably of the same kind of plastic that is used for the body member 17. A central portion of the supporting member comprises an axially shallow cylindrical plug 26 that projects a short distance into the rear end of the cylindrical wall 21 and forms the rear wall of the mixing chamber. Concentrically surrounding this plug-like central portion 26, the supporting member has a radially outwardly projecting flange-like portion 27 that flatwise overlies a front panel or wall 28 of the cabinet 6 and is secured to it as by means of mounting screws 29 that extend through aligned holes in the flange portion 27 and the panel 28. The body member 17 is secured to the supporting member 18 by means of a bayonet connection between those members, illustrated as comprising radially outwardly projecting lugs 30 on the rear of the cylindrical wall 21 and integral pocket portions 31 on the front surface of the flange portion 27 of the supporting member. The slots or grooves defined by the pocket portions 31, which snugly receive the lugs 30, open radially inwardly and circumferentially in one direction so that the main body member 17 can be installed on and removed from the supporting member 18 by the simple axial and rotational motions conventionally required for engaging and disengaging a bayonet connection. Frequent cleaning of the apparatus is encouraged by the ease and speed with which such assembly and disassembly can be accomplished.

The centrifugal agitator 20 in the mixing chamber has flat vanes or blades 33 that lie in planes which contain its axis and project radially therefrom, so that rotation of the agitator imparts radially outward motion to material in contact with it.

A tubular hub portion 35 of the agitator receives the shaft 36 of a motor 37 by which the agitator is driven. To insure a good driving connection, the motor shaft has a flat 38 and the bore of the tubular agitator hub has a shape in cross-section which accurately corresponds to that of the motor shaft. The agitator can be made as a unitary plastic molding and can have an easy force fit on the motor shaft 36.

The illustrated agitator, which has more or less triangular vanes 33, each with a hole 39 that promotes turbulence, will be recognized as one that is standard on several commercial beverage mixing and dispensing machines. In this case, however, the hub portion 35 has been shortened behind the blades, as compared with the commercial agitator, for a reason explained hereinafter.

The motor 37 that drives the agitator is mounted within the cabinet 6, on the front wall or panel 28, and its shaft 36 projects forwardly into the mixing chamber 19 through a hole in that panel and an aligned concentric hole in the supporting member 18. A resilient annular seal 40, confined in a concentric well 41 in the supporting member, snugly surrounds the motor shaft 36 to prevent leakage back along it.

The funnel-like hopper 8 is preferably made separate from the main body member 7 and can be molded of the same kind of plastic used for the body member. The cylindrical, axially short bottom portion 42 of the hopper is telescoped into the straight, upright upper portion of the inlet duct 23 so that the hopper is readily removable from the body member and, when in place thereon, guides dry material and liquid down into the inlet duct.

Figure 5:
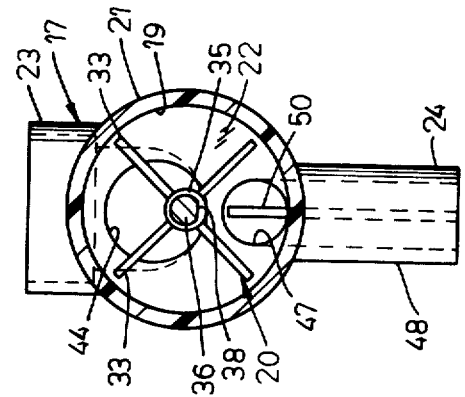
FIG. 5 is a sectional view taken on the plane of the line V—V in FIG. 3.

At its lower end the inlet duct 23 communicates with the interior of the mixing chamber through an upper aperture or port 44 in its front end wall 22. By reason of the downward and rearward curvature of the lower portion 45 of the inlet duct, dry material and liquid falling into it from the hopper 8 are deflected into nearly horizontal flow through the inlet port 44 and rearwardly into the mixing chamber. The port 44 and the directly adjacent portion of the inlet duct 23 thus define an inlet zone, and it is significant for the present invention that this inlet zone is located near the axis of the mixing chamber 19 so that material to be mixed is brought into that chamber near the axially inner portions of the agitator vanes 33, to be centrifuged outwardly by them. Thus, as best seen in FIG. 5, all portions of the inlet zone are spaced radially inwardly from the cylindrical side wall 21 of the mixing chamber, and the bottom of the inlet zone is at a level below the axis of the mixing chamber.

The upper portion 46 of the outlet duct 24, which curves forwardly and downwardly from the front wall 22 of the mixing chamber, is communicated with the interior of the mixing chamber through a lower outlet aperture or outlet port 47 in the front wall 22. The outlet port 47 and the adjacent portion of the outlet duct 24 thus define an outlet zone through which mixture issues from the mixing chamber in forward substantially horizontal motion, to be deflected downward by the curved upper portion 46 of the outlet duct and then fall through the spout-like downwardly projecting lower portion 48 of that duct. As best seen in FIG. 5, all portions of the outlet zone are spaced from the axis of the mixing chamber, inasmuch as the top of the outlet zone is at a level below the bottom of the inlet zone, and the bottom of the outlet zone is at the level of the bottom of the mixing chamber. Because of this location of the outlet zone, mixture is forced out of the mixing chamber through it under pressure developed by the centrifuging action of the agitator 20.

It will now be apparent that there is a pressure differential between the inlet zone and the outlet zone, developed by centrifuging action of the agitator 20, whereby a positive flow through the mixing chamber 19 is induced, ensuring that particles of mix material will remain in that chamber for only a relatively brief time that is not long enough for them to absorb liquid and swell or become sticky to any substantial extent. However, because of the high speed of the agitator, which is driven at speeds on the order of 15,000 to 18,000 rpm, there is an extreme turbulence in the mixing chamber which ensures a very thorough mixing of the dry material with the liquid. In addition, a certain amount of air enters the mixing chamber along with the materials to be mixed, inasmuch as the incoming materials do not completely fill the inlet duct or the throat of the hopper 8, and such air is whipped into the mixture to impart a desirable lightness and fluffiness to it and improve its flavor. As can be seen from FIG. 5, the area of the outlet port 47 is somewhat smaller than that of the inlet port 44, to induce a slight back pressure in the mixing chamber 19 that ensures thorough mixing, but this difference in port size is nevertheless small enough to enable mixed material to be readily forced out of the outlet port 47 by the pressure difference across the agitator 20.

Figure 3:
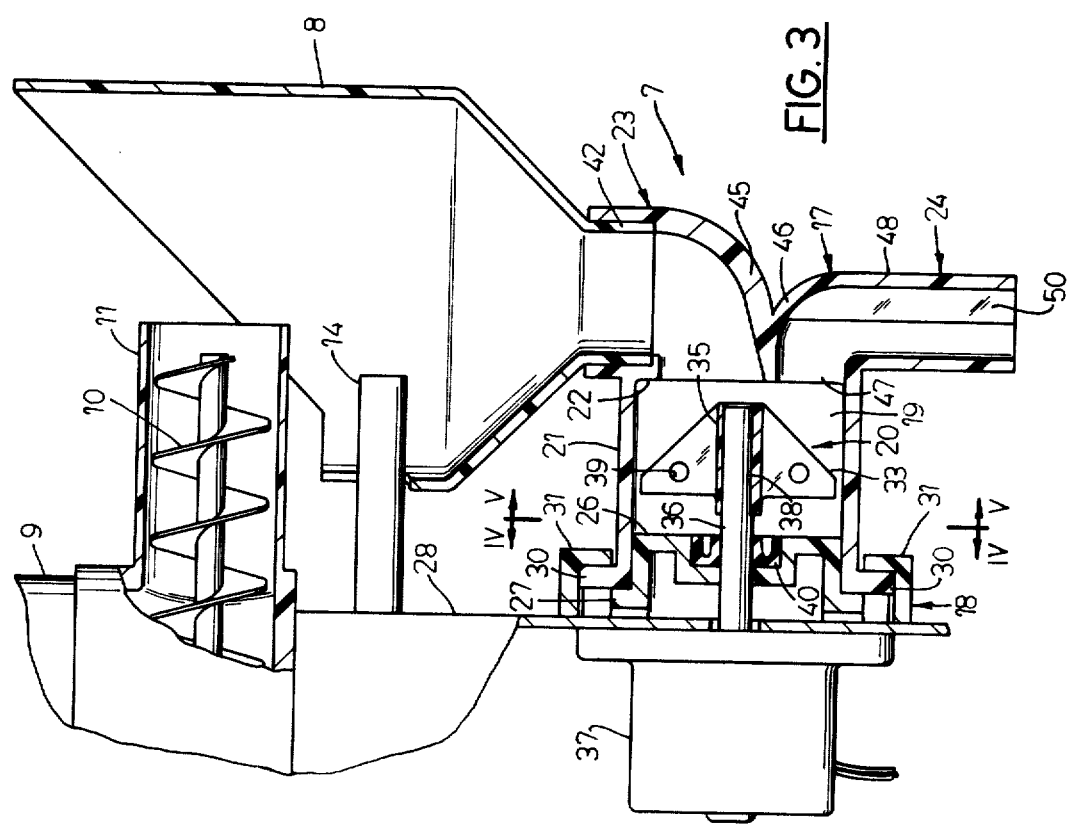
FIG. 3 is a fragmentary view, mainly in vertical section, of the portion of the machine in which feed and mixing of dry material and liquid takes place.

To ensure the necessary fast rate of flow of materials through the mixing chamber 19, that chamber should not be excessively large in relation to the dimensions of the agitator 20. Thus, as best seen in FIGS. 3 and 5, the tips of the agitator vanes 33 should be spaced only a small distance from the cylindrical side wall 21 of the agitating chamber. There can be a somewhat greater distance between the front end of the agitator and the front wall 22 of the mixing chamber because the materials to be mixed enter the mixing chamber with some rearward velocity, but that distance should be small enough to ensure that such materials will be engaged by radially inner portions of the agitator soon after they enter the mixing chamber. There can be a still larger distance between the rear edges of the agitator vanes 33 and the rear wall of the mixing chamber, but even here the distance must not be so great as to permit a "dead" zone to exist near the rear wall where mixture could stagnate and begin to congeal. Thus the axial length of the mixing chamber 19 should be somewhat less than that of the mixing chamber in a conventional hot beverage mixing and dispensing machine that incorporates an agitator generally like the one here illustrated; and the hub portion of that commercially available agitator is substantially shortened at its rear, as pointed out above, in order to permit such an agitator to fit within the shorter mixing chamber of the machine of this invention.

The mixture enters the outlet duct 24 with a rapid swirling motion, but by means of a baffle vane 50 in that duct it is caused to issure from the spout-like bottom 48 of that duct in substantially smooth, steady flow. The vane 50, which is fixed in the outlet duct on the axis thereof, is oriented to extend edgewise fore-and-aft across at least a substantial portion of the width of the duct and vertically along a substantial portion of its length.

As it emerges from the outlet spout 48, the mixture is still in essentially liquid form and therefore it is preferably run into a cup or similar container (not shown) in which it can remain for a few seconds until it congeals, after which the cup can be inverted onto a serving dish. A pushbutton switch 51 or the like, on the front of the cabinet, provides for simultaneous control of the agitator motor 37, the motor (not shown) that drives the mix auger 10 and a conventional solenoid valve (not shown) that starts and stops input of hot water into the hopper 8. Because of the short time that materials are held in the mixing chamber 19, mixture begins to issue from the outlet spout 48 almost as shown as the switch 51 is actuated, and dispensing stops almost as soon as that switch is released, so that the size of each dispensed portion can be accurately controlled.

It will be evident that because of the thorough mixing action and the whipping effected by the mixing chamber assembly of the machine of this invention, the apparatus can be readily adapted for mixing and dispensing hot chocolate. For that purpose, however, a relatively faster flow of hot water is needed than when the machine is used with mashed potato mix, and the water flow control valve 15 can therefore have defined settings that provide high and low flow rates to adapt the machine for either product. If the drive to the auger 10 is temporarily rendered inoperative, as by a suitable "flush" switch (not shown), water at the high flow rate can be advantageously used for flushing the mixing chamber assembly, so that the machine can be very quickly converted from dispensing one mixed product to dispensing the other.

From the foregoing description taken with the accompanying drawings it will be apparent that this invention provides an inexpensive and very efficient machine for reconstituting and dispensing dehydrated mashed potato mix, which machine is reliable, easily kept clean, and quickly convertible to and from use with hot chocolate mix.

Those skilled in the art will appreciate that the invention can be embodied in forms other than as herein disclosed for purposes of illustration.

The invention is defined by the following claims:

1. Mixing apparatus by which dehydrated mashed potato material can be quickly combined with hot water to produce prepared mashed potatoes, said apparatus comprising:
   A. means defining a cylindrical mixing chamber having its axis substantially horizontal and having axially opposite end walls, one of said end walls having a substantially flat inner surface and there being both an inlet port and an outlet port in said one of said end walls,
      (1) said outlet port being wholly spaced below the level of said axis and extending down to the level of the bottom of the mixing chamber, and
      (2) said inlet port extending downward from a level below that of the top of the mixing chamber to a level which is below said axis but is spaced above the top of the outlet port, so that a substantial portion of the area of the inlet port is near said axis;
   B. an agitator coaxially rotatable in said chamber, said agitator having flat blades that extend edgewise along said axis and substantially radially from it;
   C. means comprising a curved inlet duct for conducting water and dehydrated material downwardly into said inlet port; and
   D. means comprising a curved outlet duct having an upper end portion communicated with said outlet port and located wholly below said axis, for conducting mixed water and dehydrated material downwardly away from said outlet port.

2. The mixing apparatus of claim 1, further characterized by:
   E. a substantially flat baffle vane in said outlet duct, extending along a substantial portion of the length thereof and oriented to have its surfaces parallel to said axis of the mixing chamber and to the axis of a downwardly projecting portion of the outlet duct.

3. The mixing apparatus of claim 1 wherein said agitator has a rotatable shaft that projects into the mixing chamber through a coaxial seal in the other of said end walls, further characterized by:
   E. the blades of said agitator being of such radial extent as to be spaced only a small distance from the cylindrical inner surface of the mixing chamber.

4. The mixing apparatus of claim 1, further characterized by:
   E. said outlet port having a smaller area than said inlet port.

5. Mixing apparatus by which dry, particulate food and beverage materials can be quickly mixed with liquid to yield products ready to be served, said apparatus being of the type comprising a mixing chamber that has a substantially cylindrical wall concentric to a substantially horizontal axis and axially opposite end walls, a centrifuging agitator coaxially rotatable in said mixing chamber, an inlet duct for conducting dry material and liquid downwardly into said mixing chamber, and an outlet duct by which mixed product is conducted downwardly from said mixing chamber to be dispensed, said mixing apparatus being capable of mixing dehydrated mashed potato material with water to dispense mashed potato, and being characterized by:

- A. one of said end walls having a substantially flat inner surface and having apertures through which said ducts are communicated with the interior of the mixing chamber and which cooperate with the inlet duct to define an inlet zone and with the outlet duct to define an outlet zone;
- B. the inlet duct having a lower portion which curves downwardly and towards said one end wall to deflect falling liquid and dry material substantially horizontally through said inlet zone and into the mixing chamber;
- C. the outlet duct having an upper portion which is substantially wholly below said inlet duct and which curves downwardly and away from said one end wall, whereby mixture issuing substantially horizontally from the mixing chamber through said outlet zone is deflected into downward flow;
- D. said outlet zone being wholly in downwardly spaced relation to said axis and having its bottom at the level of the bottom of said cylindrical wall so that mixture is forced horizontally out of the mixing chamber through said outlet zone by centrifuging action of the agitator; and
- E. said inlet zone being wholly in radially inwardly spaced relation to said cylindrical wall and having its bottom at a level below the level of said axis but above the level of the outlet zone, a substantial portion of the inlet zone thus being near said axis so that the centrifuging action of the agitator draws dry material and liquid into the mixing chamber through said inlet zone.

6. The mixing apparatus of claim 5, further characterized by:

- F. a vane fixed in said outlet duct to stop swirling of mixed material in said duct, said vane extending edgewise along a substantial portion of the length of the outlet duct and across a substantial portion of the width thereof.

* * * * *